United States Patent
Stec et al.

(10) Patent No.: US 7,913,969 B2
(45) Date of Patent: Mar. 29, 2011

(54) SECUREMENT CLAMP SYSTEM FOR RAILCARS

(75) Inventors: Frank F. Stec, Downers Grove, IL (US); William R. Halliar, Whiting, IN (US)

(73) Assignee: TTX Company, Chicago, IL (US)

( * ) Notice: Subject to any disclaimer, the term of this patent is extended or adjusted under 35 U.S.C. 154(b) by 766 days.

(21) Appl. No.: 11/769,344

(22) Filed: Jun. 27, 2007

(65) Prior Publication Data

US 2009/0001236 A1 Jan. 1, 2009

(51) Int. Cl.
*F16M 11/00* (2006.01)
(52) U.S. Cl. .......................... 248/675; 248/690; 248/201
(58) Field of Classification Search .................. 248/689, 248/316.1, 316.8, 675, 201
See application file for complete search history.

(56) References Cited

U.S. PATENT DOCUMENTS

| | | | | |
|---|---|---|---|---|
| 3,674,246 | A * | 7/1972 | Freeman | 261/114.1 |
| 4,358,037 | A * | 11/1982 | Heideman | 224/321 |
| 4,408,742 | A * | 10/1983 | Korb | 248/74.1 |
| 4,676,473 | A * | 6/1987 | Giles | 248/638 |
| 4,982,923 | A * | 1/1991 | Wanner | 248/286.1 |
| 5,137,241 | A * | 8/1992 | Ahern | 248/298.1 |
| 5,810,322 | A * | 9/1998 | Zhao et al. | 248/675 |
| D432,901 | S * | 10/2000 | McDonald | D8/354 |
| 7,185,874 | B2 * | 3/2007 | Deiss et al. | 248/680 |

* cited by examiner

*Primary Examiner* — Terrell Mckinnon
*Assistant Examiner* — Steven M Marsh
(74) *Attorney, Agent, or Firm* — Brinks Hofer Gilson & Lione

(57) ABSTRACT

A clamp for securing a bearing block to a railcar that includes first and second securing brackets, each securing bracket having a sheer lug coupled to each securing bracket to fit within an opening of a deck of the railcar; a locking lug coupled to each sheer lug to extend substantially parallel to and under the deck of the railcar; and a fastener with which to secure the first and second securing brackets to the bearing block.

29 Claims, 4 Drawing Sheets

SECUREMENT CLAMP SYSTEM FOR RAILCARS

BACKGROUND

1. Technical Field

The disclosed embodiments relate to a securement clamp system for railcars, and more specifically, to a clamp system for securing bearing blocks and the like to a flat car.

2. Related Art

Bearing blocks or other structures are used to provide resistance to movement of loads placed upon flat railcars. Various types of brackets, some of them slotted, have been used to secure such bearing blocks or structures to the railcar surface. Conventionally, these brackets require multiple points of attachment to the railcar. To remove the brackets, the bearing block or structure must first be removed. Accordingly, removing or relocating the bearing blocks from or along a railcar surface can be a very time-intensive process. It can also be expensive to replace conventionally-used brackets, which cost more to manufacture.

SUMMARY

By way of introduction, the embodiments described below include a securement clamp to secure bearing blocks and other structures to a flat railcar.

In a first aspect, a clamp for securing a bearing block to a railcar includes first and second securing brackets in which each securing bracket has a sheer lug coupled to each securing bracket to fit within an opening of a deck of the railcar, a locking lug coupled to each sheer lug to extend substantially parallel to and under the deck of the railcar, and a fastener with which to secure the first and second securing brackets to the bearing block.

In a second aspect, a clamp system for securing a bearing block to a railcar includes a plurality of clamps each having first and second securing brackets and a fastener with which to secure the first and second securing brackets to the bearing block, first and second sheer lugs coupled to respective first and second securing brackets to fit within openings of a deck of the railcar, and first and second locking lugs coupled to respective first and second sheer lugs to extend horizontally under the deck of the railcar. The first and second locking lugs of the plurality of clamps are intermittently inserted through a corresponding plurality of openings defined in the deck of the railcar. The clamp system may further include a bolt, wherein each bolt passes through an aperture defined through each of the first and second securing brackets, and a nut threaded onto each end of the bolt to secure the first and second securing brackets to the bearing block.

In a third aspect, a clamp for securing a bearing block to a railcar includes a first molded piece of metal defining at one end thereof a securing bracket having an aperture defined therethrough, in the middle thereof a sheer lug to fit within an opening of a deck of the railcar, and at the other end thereof a locking lug to extend substantially parallel to and under the deck of the railcar. A first fastener that passes through the aperture and at least partway through the bearing block to secure the securing bracket to the bearing block. The clamp may further include a bolt and a nut secured on each end of the bolt, and at least one washer positioned between one of the nuts and the securing bracket. The clamp may further include a second molded piece of metal and a second fastener, wherein the first and second molded pieces of metal together with the first and second fasteners are respectively secured on opposite sides and on either ends of the bearing block.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

In some cases, well known structures, materials, or operations are not shown or described in detail. Furthermore, the described features, structures, or characteristics may be combined in any suitable manner in one or more embodiments. It will also be readily understood that the components of the embodiments as generally described and illustrated in the Figures herein could be arranged and designed in a wide variety of different configurations.

Figure 1:
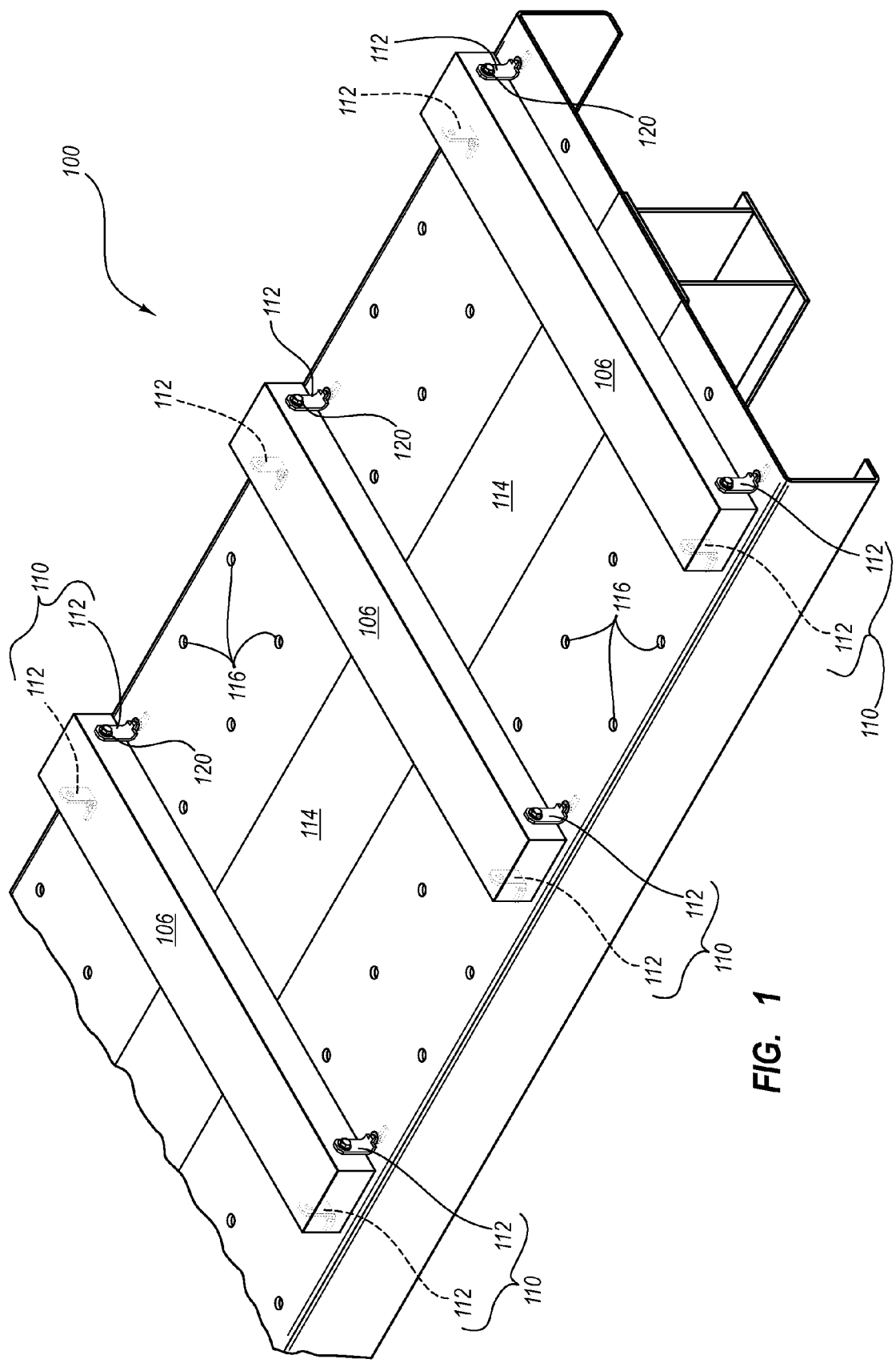
FIG. 1 is a perspective view of a section of an embodiment of a railcar having secured thereon bearing blocks with securement clamps as disclosed herein.

FIG. 1 is a perspective view of an embodiment of a railcar 100 having secured thereon bearing blocks 106 with a plurality of securement clamps 110, each including two opposing securing brackets 112. As shown, a bearing block 106 may be secured to a deck 114 of the railcar 104 with two pairs of securing brackets 112, one pair at each end of the bearing block 106. Additionally, in an alternate embodiment (not shown), a single securing bracket 112 may be used at either end of the bearing block 106. The railcar 104 may be a multiple purpose or transformable flat car, and may accept multiple bearing blocks 106 as required to secure different types of loads.

As will be explained in more detail with reference to FIGS. 5 and 6, the securement clamps 110 are easily removable by removing a bolt (or other fastener) 120 from the securing brackets 112 with which they are secured to the bearing blocks 106. Once the bolt 120 is removed, the securement clamps 110 may be extracted from holes (or openings) 116 formed through the deck 114. This facilitates rapid removal or repositioning of the bearing blocks 106.

Figure 2:
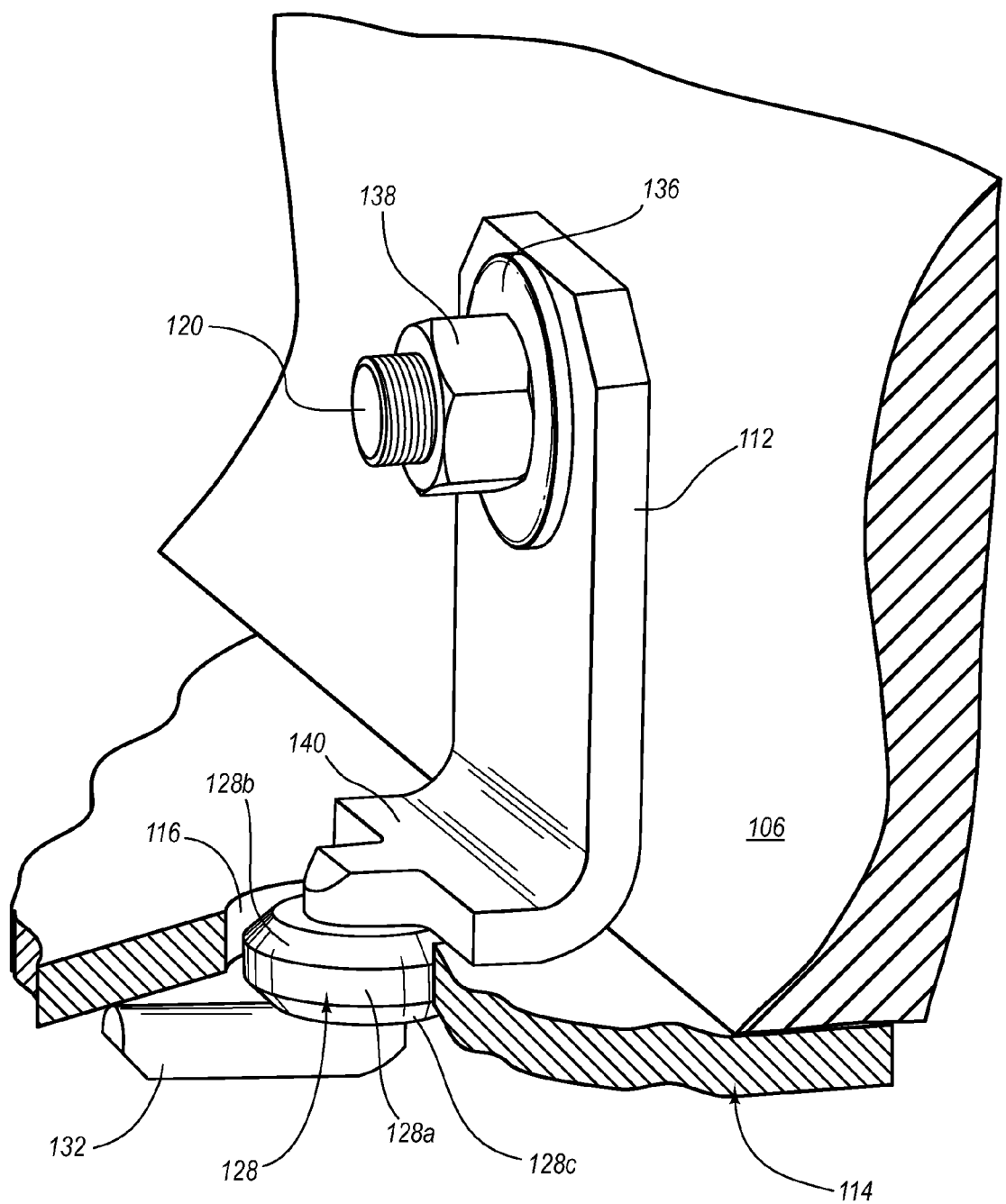
FIG. 2 is a perspective view of a section of a securement clamp within a cut-away of a railcar deck as deployed to secure a bearing block to the railcar deck.

FIG. 2 is a perspective view of one side of a securement clamp 110 within a cut-away of a railcar deck 114 as deployed to secure a bearing block 106 to the deck 114. It should be understood that, in this embodiment, the other side of the securement clamp 110 substantially mirrors that displayed in FIG. 2. The securement clamp 110 includes a securing bracket 112, a sheer lug 128, and a locking lug 132. The securing bracket 112, the sheer lug 128, and the locking lug 132 may be molded as a single piece with reinforcing welds at positions of transition, or may be molded or fabricated separately and coupled together by welding. When molded together as one piece, it may be through casting or forging. Additionally, the securing bracket 112 has been depicted herein as generally rectangular, but may be formed of varying geometric shapes, such as triangular, square, or other oblong shapes.

The bolt 120 passes through an aperture (142 in FIG. 3) formed near the top of each securing bracket 112, through a washer 136, and finally through a nut 138 to ensure that each securing bracket 112 remains fastened to the bearing block 106. The aperture 142 may be threaded so that the bolt 120 may be threaded therethrough. Note that other forms of securement of the securing bracket 112 to the bearing block 106 are contemplated so long as they provide sufficient strength to withstand forces of pressure that may be exerted against a bearing block 106 for loads contemplated for transportation on the railcar 100.

For instance, one of skill in the art will appreciate that more than one bolt 120, or other fastening means, may also be used in alternative embodiments. For example, various forms of bolts (such as a huck, lock, or grip bolt) or rivets may be used such that a separate nut 138 and/or washer 136 are not required. Likewise, a screw may be threaded through each aperture 142 of each securing bracket 112 and into the bearing block 106.

In an alternate embodiment (not shown), a securement clamp 110 may include only a single securing bracket 112. In such an embodiment, two securement clamps 110 are preferably positioned on opposite ends, and on opposite sides, of a bearing block 106 to secure the bearing block 106 to the deck 114. The bolt 120 may still be employed with the washer 136 and nut 138, wherein an additional nut 138 (and optionally an additional washer 136) is threaded on the bolt on the side of the bearing block 106 opposite from the securing bracket 112. Other fasteners such as those discussed above may optionally be used to the extent that the combination of the securement clamps 110 having a single securing bracket 112 provide sufficient resistive force to contemplated loads of the railcar 100. Such loads may require less than a thousand pounds of resistive force or variably increase to require many thousands of pounds of resistive force.

The securing bracket 112 may be curved with a substantially L-shaped portion 140 at one end thereof that is coupled to the sheer lug 128. The L-shaped portion 140 helps to provide a higher resistance to sheer force (up to 40,000 pounds) in the sheer lug 132 due to pressures placed on the bearing blocks 106 from heavy loads and/or fast changes in a train's speed or direction. The sheer lug 112 so formed and located within the deck 114 of a railcar 100 will resist lateral forces while the locking lug 132 coupled thereto will resist longitudinal forces, such as those produced from the railcar 100 bouncing on a track or suddenly descending down an incline. The sheer lug 112 may be formed with three substantially flat surfaces at an angle to each other. For instance, a middle surface 128a may be formed adjacent to first and second side surfaces 128b and 128c. As shown in FIG. 2, the angle between the middle surface 128a and both of the two side surfaces 128b and 128c may be approximately 45 degrees.

Figure 4:
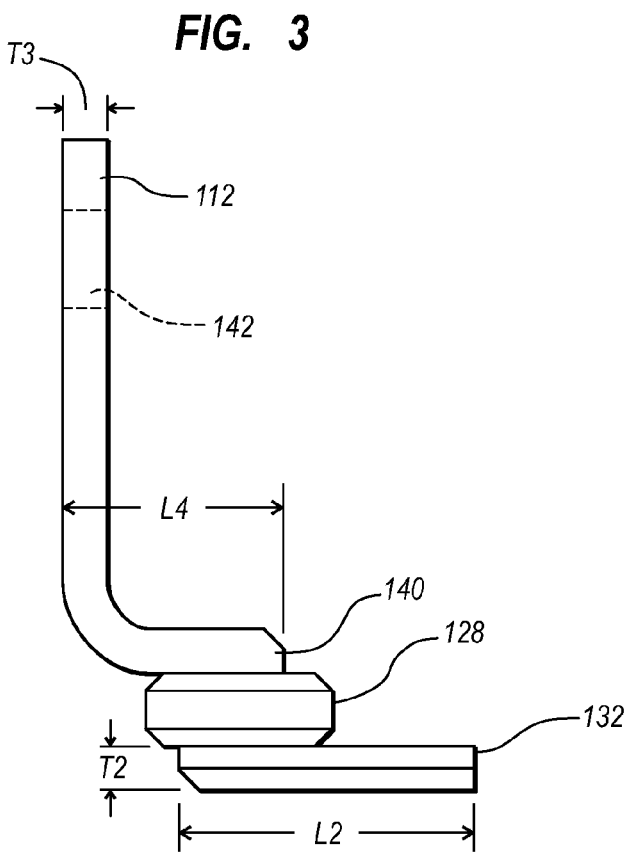
Figure 5:
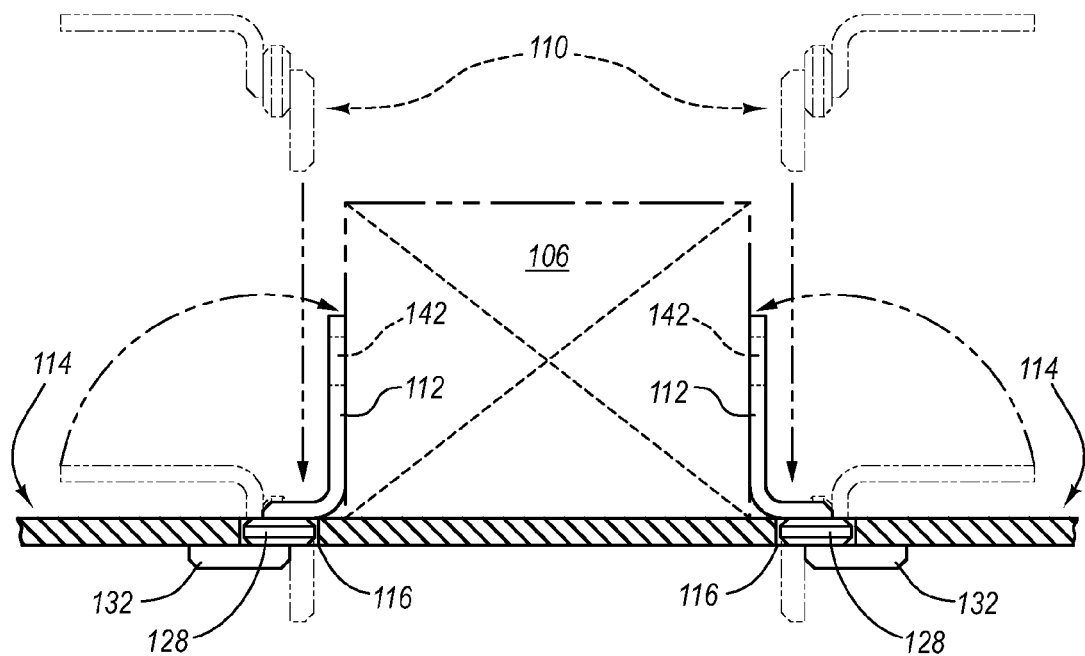
FIG. 5 is a cross-sectional view of a bearing block showing a pair of securing brackets being positioned through a railcar deck and against the bearing block.

For a tight fit and higher sheer strength, the sheer lug 128 may be molded to snugly fit within the holes 116 in the deck 114, but not so tight that the sheer lug 112 cannot pivot within the holes 116 (see FIG. 5). For instance, the holes 116 may be formed of a diameter of approximately one and three-quarter inches while the sheer lug 112 may be formed of a diameter (D1) of approximately one and eleven-sixteenths inches. Additionally, the thickness (T1) of the sheer lug 128 may be approximately five-eighths of an inch, while the width (W1) of the portion defined by each of the two side surfaces 128b or 128c may be approximately three-sixteenths of an inch (see FIGS. 3 and 4).

Figure 3:
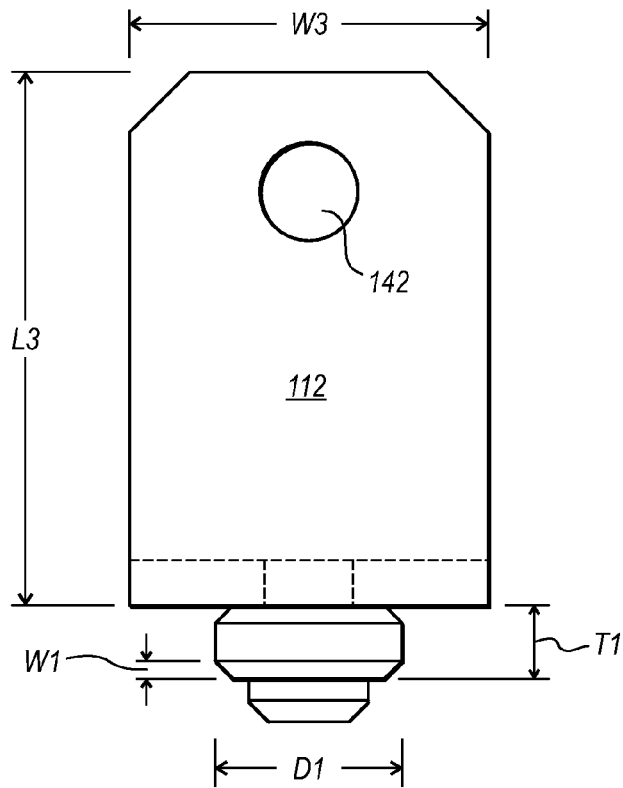
FIGS. 3 and 4 are, respectively, rear and side plan views of an embodiment of a securing bracket of a securement clamp as disclosed herein.

FIGS. 3 and 4 are, respectively, rear and side plan views of an embodiment of a securement clamp 110 as disclosed herein. An aperture 142 is formed near a distal end of the securing bracket 112 through which the bolt 120 (or other fastening mechanism) is inserted. Various measurements provided are exemplary only, and varying the size or relative sizes of the securing bracket 112, the sheer lug 128, and the locking lug 132 is contemplated within the scope and spirit of this disclosure.

The locking lug 132 may be about two and one-half inches long (L2) and about three-eighths of an inch thick (T2). The securing bracket 112 may be formed so that the upper (securing) portion is about four and one-half inches long (L3), three inches wide (T3), and about three-eights of an inch thick (T3). The portion of the securing bracket 112 that connects to the sheer lug 128 may be about one and seven-eighths inches in length (L4). While these sizes may have been favorable in the development of a securement bracket 110, varying the sizes in various respects is within the scope of this disclosure, as mentioned.

FIG. 5 is a cross-sectional view of a bearing block 106 showing a pair of securing brackets 112 being positioned through a railcar deck 114 and against the bearing block 106.

Note that the securing brackets 112 are deployed within the deck 114 by inserting the locking lugs 132 through the holes 116 so that the sheer lugs 128 are located within the hole 114 (shown in dashed lines). Rotating the securing brackets 112 (as shown by the dashed arrow in FIG. 5) to an upright position against the bearing block 106 positions the sheer lugs 132 flush with the deck 114 within the holes 114 and the aperture 142 against the bearing block 106. In this position, the bolt 120 may be inserted through the aperture 142 and the bearing block 106 and secured in place with the nuts 138.

Figure 6:
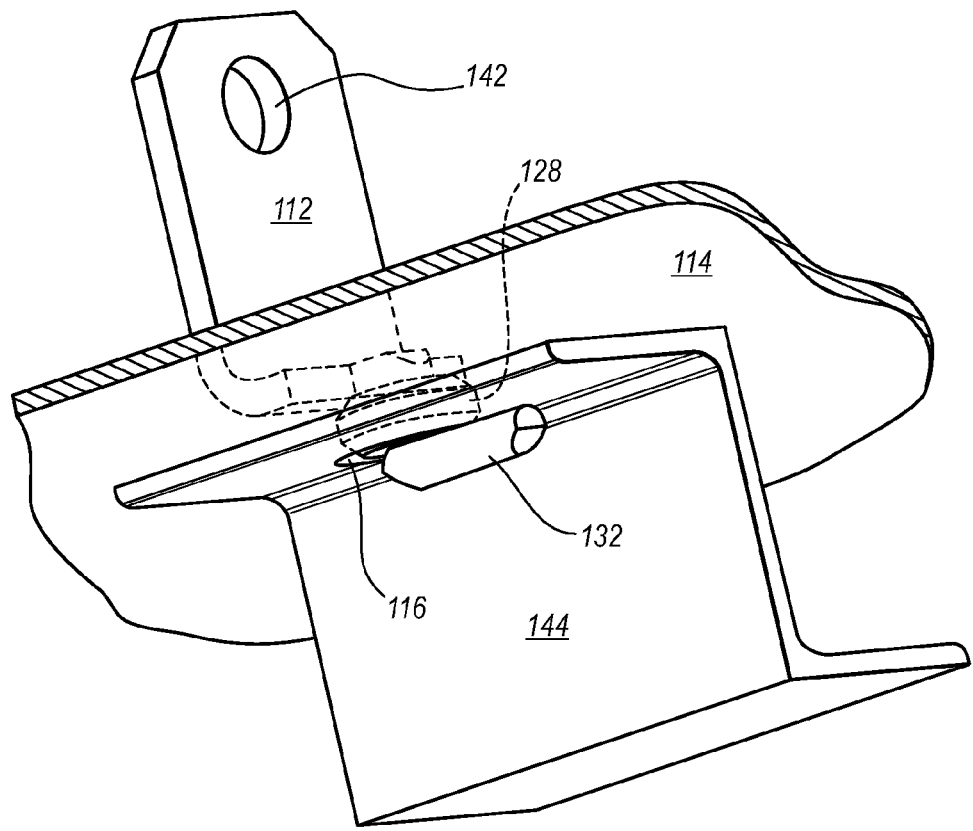
FIG. 6 is a bottom perspective view showing a securing bracket of a securement clamp from the underside of a railcar deck, including a support plate.

FIG. 6 is a bottom perspective view showing a securing bracket 112 of a securement clamp 110 from the underside of a railcar deck 114, including a support plate 144. Note that once inserted into the hole 116, the locking lug 132 is substantially parallel with the underside of the deck 114. Also, the sheer lug 128 is positioned within the thickness of the deck 114, and the locking lug 132 prevents the securement clamp 110 from coming up through the deck 114 while the securing bracket 112 is fastened to a bearing block 106 or other structure. Note also that the structure 144 is shown as an extension of the deck 114 or a structure 144 attached to the deck as part of the railcar 100. The structure 144 may be a floor stringer that runs the length of the railcar 100 designed to give the deck 114 extra support depending on the expected loads. The structure 144 may also be a plate designed to effectively thicken the deck 114 strategically where the holes 116 are formed to provide extra support and strength at the location of the sheer lugs 128, and so that the sheer lugs 128 lie completely within the deck 114. Additionally, a floor stringer may double as a supportive plate in the structure 144 employed.

The terms and descriptions used herein are set forth by way of illustration only and are not meant as limitations. Those skilled in the art will recognize that many variations can be made to the details of the above-described embodiments without departing from the underlying principles of the invention. The scope of the invention should therefore be determined only by the following claims (and their equivalents) in which all terms are to be understood in their broadest reasonable sense unless otherwise indicated.

The invention claimed is:

1. A clamp system for securing a bearing block to a railcar, comprising:
   a plurality of clamps each comprising:
      first and second securing brackets;
      a fastener with which to secure the first and second securing brackets to the bearing block;
      first and second sheer lugs coupled to respective first and second securing brackets to fit within openings of a deck of the railcar; and
      first and second locking lugs coupled to respective first and second sheer lugs to extend horizontally under the deck of the railcar;
   wherein the first and second locking lugs of each clamp intermittently inserted through a corresponding plurality of openings defined in the deck of the railcar.

2. The clamp of claim 1, wherein each sheer lug has a diameter comprising about one and three-quarter inches.

3. The clamp of claim 1, wherein each of the first and second securing brackets define at one end thereof a substantially L-shaped portion to be coupled to each respective sheer lug.

4. The clamp of claim 1, wherein each sheer lug is formed to define on its outer perimeter first and second surfaces defined on the top and bottom at an angle to a third surface formed in between the first and second surfaces, the first, second and third surfaces being substantially flat.

5. The claim of claim 4, wherein the angle comprises approximately 45 degrees.

6. The clamp of claim 1, wherein the locking lug is approximately two and one-half inches long.

7. The clamp of claim 1, wherein the fastener comprises:
   a bolt that passes through an aperture defined through each of the first and second securing brackets and through the bearing block; and
   a nut threaded onto each end of the bolt to secure the first and second securing brackets in place.

8. The clamp of claim 7, further comprising:
   a washer positioned between the bearing block and the nut.

9. The clamp of claim 1, wherein the fastener comprises a rivet that passes through and secures the first and second securing brackets.

10. The clamp system of claim 1, wherein the fastener comprises:
    a bolt, wherein each bolt passes through an aperture defined through each of the first and second securing brackets; and
    a nut threaded onto each end of the bolt to secure the first and second securing brackets to the bearing block.

11. The clamp system of claim 1, wherein the fastener comprises at least one of a huck bolt, a locking bolt, a rivet, and a screw.

12. The clamp system of claim 1, wherein each of the openings in the deck of the railcar is circular and has a diameter corresponding substantially in size to a diameter of the sheer lugs, wherein the sheer lugs fit within the plurality of openings.

13. The clamp system of claim 1, wherein the diameter of the openings in the deck of the railcar comprise about one and three-quarter inches.

14. The clamp system of claim 1, wherein the railcar comprises a flat car.

15. The clamp system of claim 1, wherein the plurality of clamps comprises at least two sets, one set secured to each end of the bearing block.

16. The clamp system of claim 1, further comprising:
    a support structure attached to the bottom of the deck to form a portion of the deck where the openings are defined through the deck.

17. The clamp of claim 1, wherein the sheer lug has a diameter comprising about one and three-quarter inches.

18. The clamp of claim 1, wherein the sheer lug is formed to define on its outer perimeter first and second surfaces defined on the top and bottom at an angle to a third surface formed in between the first and second surfaces, the first, second, and third surface being substantially flat.

19. The clamp of claim 1, wherein at an end of the securing bracket proximate to the sheer lug, the securing bracket is bent to form a substantially L-shaped portion thereof from which is defined the sheer lug.

20. The clamp of claim 19, wherein the bent end of the securing bracket is approximately one and seven-eighths inches long.

21. The clamp of claim 1, wherein the locking lug is approximately two and one-half inches long and approximately three-eighths of an inch thick.

22. The clamp of claim 1, wherein the securing bracket is approximately four and one-half inches long and approximately three-eighths inches thick.

23. A clamp for securing a bearing block to a railcar, comprising:
    first and second securing brackets, each securing bracket having:
       a sheer lug coupled to each securing bracket to fit within an opening of a deck of the railcar;
       a locking lug coupled to each sheer lug to extend substantially parallel to and under the deck of the railcar; and
       a fastener with which to secure the first and second securing brackets to the bearing block; and
    wherein each sheer lug is formed to define on its outer perimeter first and second surfaces defined on the top and bottom at an angle of approximately 45 degrees to a third surface formed in between the first and second surfaces, the first, second and third surfaces being substantially flat.

24. A clamp for securing a bearing block to a railcar, comprising:
    a first molded piece of metal defining:
       at one end thereof a securing bracket having an aperture defined therethrough;
       in the middle thereof a sheer lug to fit within an opening of a deck of the railcar; and
       at the other end thereof a locking lug to extend substantially parallel to and under the deck of the railcar; and
    a first fastener that passes through the aperture and at least partway through the bearing block to secure the securing bracket to the bearing block;
    a second molded piece of metal defining:
       at one end thereof a securing bracket having a second aperture defined therethrough;
       in the middle thereof a second sheer lug to fit within an opening of the deck of the railcar; and
       at the other end thereof a second locking lug to extend substantially parallel to and under the deck of the railcar; and
    a second fastener, wherein the first and second molded pieces of metal together with the first and second fasteners are respectively secured on opposite sides and on either ends of the bearing block; and
a bolt;
a nut secured on each end of the bolt; and
at least one washer positioned between one of the nuts and the securing bracket.

25. The clamp of claim 24, wherein the first and second fasteners comprise at least one of a huck bolt, a locking bolt, a rivet, and a screw.

26. A clamp for securing a bearing block to a railcar, comprising:
a first molded piece of metal defining:
at one end thereof a securing bracket having an aperture defined therethrough;
in the middle thereof a sheer lug to fit within an opening of a deck of the railcar; and
at the other end thereof a locking lug to extend substantially parallel to and under the deck of the railcar; and
a first fastener that passes through the aperture and at least partway through the bearing block to secure the securing bracket to the bearing block;
wherein the sheer lug is formed to define on its outer perimeter first and second surfaces defined on the top and bottom at an angle to a third surface formed in between the first and second surfaces, the first, second, and third surface being substantially flat.

27. The clamp of claim 26, wherein at an end of the securing bracket proximate to the sheer lug, the securing bracket is bent to form a substantially L-shaped portion thereof from which is defined the sheer lug.

28. The clamp of claim 27, wherein the bent end of the securing bracket is approximately one and seven-eighths inches long.

29. A method for securing a bearing block to a railcar, comprising:
molding a first securing bracket from a single metal piece, the first securing bracket having:
a sheer lug coupled to the securing bracket to fit within an opening of a deck of the railcar; and
a locking lug coupled to the sheer lug to extend substantially parallel to and under the deck of the railcar;
molding a second securing bracket from a single metal piece, the second securing bracket having:
a sheer lug coupled to the securing bracket to fit within an opening of a deck of the railcar; and
a locking lug coupled to the sheer lug to extend substantially parallel to and under the deck of the railcar;
securing the first securing bracket to a railcar deck;
securing the second securing bracket to the railcar deck; and
attaching the first and second securing brackets to the bearing block with a fastener.

\* \* \* \* \*